April 15, 1969  P. L. RUBEN  3,438,696
TRIPLET-TYPE OBJECTIVE LENS
Filed Jan. 23, 1967
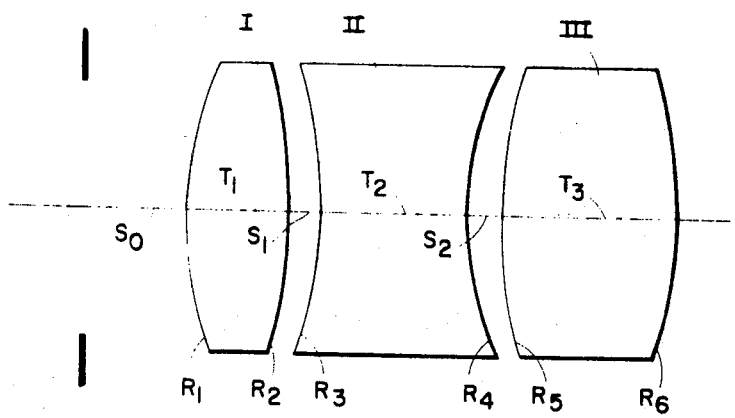
PAUL L. RUBEN
INVENTOR.
BY William F. Delany Jr.
Robert W Hampton
ATTORNEYS

United States Patent Office 3,438,696
Patented Apr. 15, 1969

3,438,696
TRIPLET-TYPE OBJECTIVE LENS
Paul L. Ruben, Penfield, N.Y., assignor to Eastman Kodak Company, Rochester, N.Y., a corporation of New Jersey
Filed Jan. 23, 1967, Ser. No. 610,883
Int. Cl. G02b 9/14
U.S. Cl. 350—226    7 Claims

ABSTRACT OF THE DISCLOSURE

A photographic objective of the simple triplet type is disclosed which is well corrected for high relative apertures and is particularly suited for use in motion picture cameras.

---

This invention relates to improvements in photographic objectives of the simple triplet type having a high relative aperture.

An object of this invention is to provide an improved simple triplet type of photographic objective, having a relative aperture of at least $f/2.7$, which is well corrected for spherical and chromatic aberrations, coma, astigmatism, flatness of field, and is particularly suited for use on motion picture cameras.

Further objects and advantages will be found in the details of construction disclosed in the accompanying examples and drawing.

The present invention comprises triplet objectives having two outer positive biconvex elements and an inner negative biconcave element. The inner negative elements of the triplets of this invention are as thick as, and in most embodiments thicker than, the positive elements. These thick negative elements are used to balance astigmatism and provide additional negative power without an excessive increase in spherical aberration. The lenses of this invention all have their diaphragms located in front of the lens system.

The drawing shows a cross sectional view of an objective embodying the invention with the long conjugate on the left.

The objective in the drawing comprises three airspaced simple lenses, designated I, II and III. The outer two lenses I and III are positive biconvex elements, and the inner lens II is a thick negative concave element. The diaphragm is located in front of lens I.

Numerical data for constructing seven embodiments of photographic objectives according to the invention as outlined above is given in the following examples in which the lens elements are numbered from front to rear, N is the index of refraction of the lens elements for the D line, V is the index of dispersion, and R, T and S refer respectively to the radii of curvature of the lens surfaces, the thicknesses of the lens elements and the airspaces between the elements, numbered by subscript from front to rear.

EXAMPLE 1
[Equivalent Focal Length=100 mm.    $f/1.6$]

| Lens | $N_D$ | V | Radii (mm.) | Thicknesses and Spacings (mm.) |
|---|---|---|---|---|
| Stop | | | | $S_0=14.3$ |
| I | 1.75 | 50.6 | $R_1=72.9$ | $T_1=18.6$ |
| | | | $R_2=-189.9$ | $S_1=7.43$ |
| II | 1.72 | 29.3 | $R_3=-90.3$ | $T_2=48.6$ |
| | | | $R_4=48.4$ | $S_2=1.89$ |
| III | 1.75 | 50.6 | $R_5=75.0$ | $T_3=22.9$ |
| | | | $R_6=-75.0$ | |

EXAMPLE 2
[Equivalent Focal Length=100 mm.    $f/1.6$]

| Lens | $N_D$ | V | Radii (mm.) | Thicknesses and Spacings (mm.) |
|---|---|---|---|---|
| Stop | | | | $S_0=14.3$ |
| I | 1.75 | 50.6 | $R_1=68.7$ | $T_1=19.2$ |
| | | | $R_2=-371$ | $S_1=10.7$ |
| II | 1.72 | 29.3 | $R_3=-95.5$ | $T_2=32.3$ |
| | | | $R_4=42.0$ | $S_2=5.6$ |
| III | 1.75 | 50.6 | $R_5=67.9$ | $T_3=27.4$ |
| | | | $R_6=-67.9$ | |

EXAMPLE 3
[Equivalent Focal Length=100 mm.    $f/1.8$]

| Lens | $N_D$ | V | Radii (mm.) | Thicknesses and Spacings (mm.) |
|---|---|---|---|---|
| Stop | | | | $S_0=10.7$ |
| I | 1.70 | 56.2 | $R_1=64.3$ | $T_1=21.4$ |
| | | | $R_2=-293$ | $S_1=8.29$ |
| II | 1.67 | 32.0 | $R_3=-76.4$ | $T_2=21.4$ |
| | | | $R_4=49.1$ | $S_2=6.71$ |
| III | 1.70 | 56.2 | $R_5=86.9$ | $T_3=13.0$ |
| | | | $R_6=-63.4$ | |

In the above three examples all elements are formed from glass having a high index of refraction $N_D$ to reduce spherical aberration. The middle negative elements have lower indexes of refraction than the positive elements to flatten the field.

EXAMPLE 4
[Equivalent Focal Length=100 mm.    $f/2.7$]

| Lens | $N_D$ | V | Radii (mm.) | Thicknesses and Spacings (mm.) |
|---|---|---|---|---|
| Stop | | | | $S_0=14.5$ |
| I | 1.49 | 57.4 | $R_1=45.4$ | $T_1=14.0$ |
| | | | $R_2=-88.6$ | $S_1=4.07$ |
| II | 1.57 | 36.6 | $R_3=-59.9$ | $T_2=19.9$ |
| | | | $R_4=41.4$ | $S_2=4.71$ |
| III | 1.61 | 58.8 | $R_5=71.8$ | $T_3=23.7$ |
| | | | $R_6=-71.8$ | |

Example 4 is an embodiment of this invention in which the front two components are formed from plastic and the third component is formed from glass. The use of plastic-glass combinations in triplets is disclosed in U.S. Patent 3,194,116 in which the negative element is formed from a copolymer of acrylonitrile and styrene having an index of refraction $N_D$ about 1.56 and index of dispersion V about 37. To balance the effect of thermal expansion, one of the positive elements is formed from a plastic, preferably methylmethacrylate having an index of refraction $N_D$ about 1.49 and an index of dispersion about 57.

EXAMPLE 5
[Equivalent Focal Length=100 mm.    f/2.7]

| Lens | $N_D$ | V | Radii (mm.) | Thicknesses and Spacings (mm.) |
|---|---|---|---|---|
| Stop |  |  |  | $S_0=13.8$ |
| I | 1.61 | 57.2 | $R_1=53.5$ | $T_1=17.0$ |
|  |  |  | $R_2=-143$ |  |
|  |  |  | $R_3=-69.5$ | $S_1=6.21$ |
| II | 1.65 | 33.8 | $R_4=42.5$ | $T_2=21.6$ |
|  |  |  | $R_5=71.8$ | $S_2=6.21$ |
| III | 1.61 | 57.2 | $R_6=-60.8$ | $T_3=18.4$ |

EXAMPLE 6
[Equivalent Focal Length=100 mm.    f/2.7]

| Lens | $N_D$ | V | Radii (mm.) | Thicknesses and Spacings (mm.) |
|---|---|---|---|---|
| Stop |  |  |  | $S_0=14.8$ |
| I | 1.61 | 58.6 | $R_1=50.8$ | $T_1=19.5$ |
|  |  |  | $R_2=-152$ |  |
|  |  |  | $R_3=-69.1$ | $S_1=6.29$ |
| II | 1.65 | 33.9 | $R_4=39.5$ | $T_2=19.6$ |
|  |  |  | $R_5=68.2$ | $S_2=7.4$ |
| III | 1.61 | 58.6 | $R_6=-61.4$ | $T_3=18.5$ |

EXAMPLE 7
[Equivalent Focal Length=100 mm.    f/2.7]

| Lens | $N_D$ | V | Radii (mm.) | Thicknesses and Spacings (mm.) |
|---|---|---|---|---|
| Stop |  |  |  |  |
| I | 1.61 | 58.6 | $R_1=52.0$ | $T_1=15.7$ |
|  |  |  | $R_2=-83.7$ | $S_1=1.3$ |
|  |  |  | $R_3=-63.4$ |  |
| II | 1.61 | 37.0 | $R_4=47.6$ | $T_2=21.6$ |
|  |  |  | $R_5=135$ | $S_2=2.9$ |
| III | 1.61 | 58.6 | $R_6=-69.7$ | $T_3=11.5$ |

In the above examples, 5, 6 and 7, all elements are formed from glass, as in the first three examples.

Although the invention has been described in considerable detail with reference to certain preferred embodiments thereof, it will be understood that variations and modifications can be effected without departing from the spirit and scope of the invention as described hereinabove.

I claim:

1. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.75 | 50.6 | $R_1=.729F$ | $T_1=.186F$ |
|  |  |  | $R_2=-1.90F$ | $S_1=.074F$ |
| II | 1.72 | 29.3 | $R_3=-.903F$ | $T_2=.486F$ |
|  |  |  | $R_4=.484F$ | $S_2=.019F$ |
| III | 1.75 | 50.6 | $R_5=.750F$ | $T_3=.229F$ |
|  |  |  | $R_6=-.750F$ |  |

2. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.75 | 50.6 | $R_1=.687F$ | $T_1=.192F$ |
|  |  |  | $R_2=-3.71F$ | $S_1=.107F$ |
| II | 1.72 | 29.3 | $R_3=-.955F$ | $T_2=.323F$ |
|  |  |  | $R_4=.420F$ | $S_2=.056F$ |
| III | 1.75 | 50.6 | $R_5=.679F$ | $T_3=.274F$ |
|  |  |  | $R_6=-.679F$ |  |

3. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.70 | 56.2 | $R_1=.643F$ | $T_1=.214F$ |
|  |  |  | $R_2=-2.93F$ | $S_1=.083F$ |
| II | 1.67 | 32.0 | $R_3=-.764F$ | $T_2=.214F$ |
|  |  |  | $R_4=.491F$ | $S_2=.067F$ |
| III | 1.70 | 56.2 | $R_5=.869F$ | $T_3=.130F$ |
|  |  |  | $R_6=.634F$ |  |

4. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1=.454F$ $R_2=-.886F$ | $T_1=.140F$ $S_1=.041F$ |
| II | 1.57 | 36.6 | $R_3=-.599F$ $R_4=.414F$ | $T_2=.199F$ $S_2=.047F$ |
| III | 1.61 | 58.8 | $R_5=.718F$ $R_6=-.718F$ | $T_3=.237F$ |

5. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 57.2 | $R_1=.535F$ $R_2=-1.43F$ | $T_1=.170F$ $S_1=.062F$ |
| II | 1.65 | 33.8 | $R_3=-.695F$ $R_4=.425F$ | $T_2=.216F$ $S_2=.062F$ |
| III | 1.61 | 57.2 | $R_5=.718F$ $R_6=-.608F$ | $T_3=.184F$ |

6. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 58.6 | $R_1=.508F$ $R_2=-1.52F$ | $T_1=.195F$ $S_1=.063F$ |
| II | 1.65 | 33.9 | $R_3=-.691F$ $R_4=.395F$ | $T_2=.196F$ $S_2=.074F$ |
| III | 1.61 | 58.6 | $R_5=.682F$ $R_6=-.614F$ | $T_3=.185F$ |

7. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 58.6 | $R_1=.520F$ $R_2=-.837F$ | $T_1=.157F$ $S_1=.013F$ |
| II | 1.61 | 37.0 | $R_3=-.634F$ $R_4=.476F$ | $T_2=.216F$ $S_2=.029F$ |
| III | 1.61 | 58.6 | $R_5=1.35F$ $R_6=-.697F$ | $T_3=.115F$ |

References Cited

UNITED STATES PATENTS 2,736,234 2/1956 Schlumpf _____ 350—226
2,962,930 12/1960 Johnson _____ 350—206

DAVID SCHONBERG, *Primary Examiner.*

R. J. STERN, *Assistant Examiner.*

U.S. Cl. X.R.

350—206